Dec. 30, 1952　　　　　　J. RIEMER　　　　　　2,623,338
PACKAGING MACHINE
Filed Jan. 13, 1950　　　　　　　　　　　　　　10 Sheets-Sheet 1

Inventor:
John Riemer
By: Soans, Pond & Anderson
Atty's.

Dec. 30, 1952   J. RIEMER   2,623,338
PACKAGING MACHINE
Filed Jan. 13, 1950   10 Sheets-Sheet 3

Inventor:
John Riemer
By: Soans, Pond, & Anderson
attys.

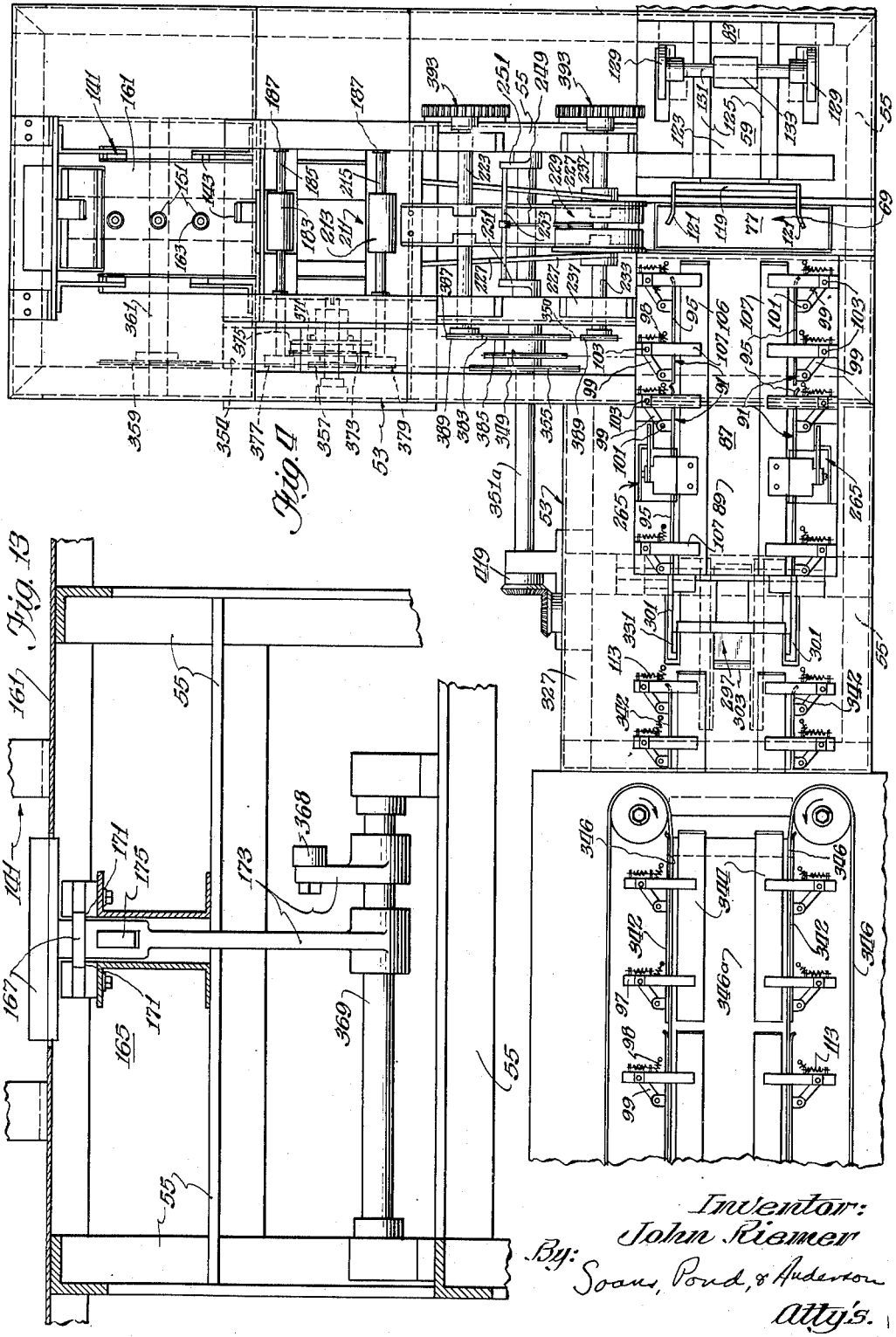

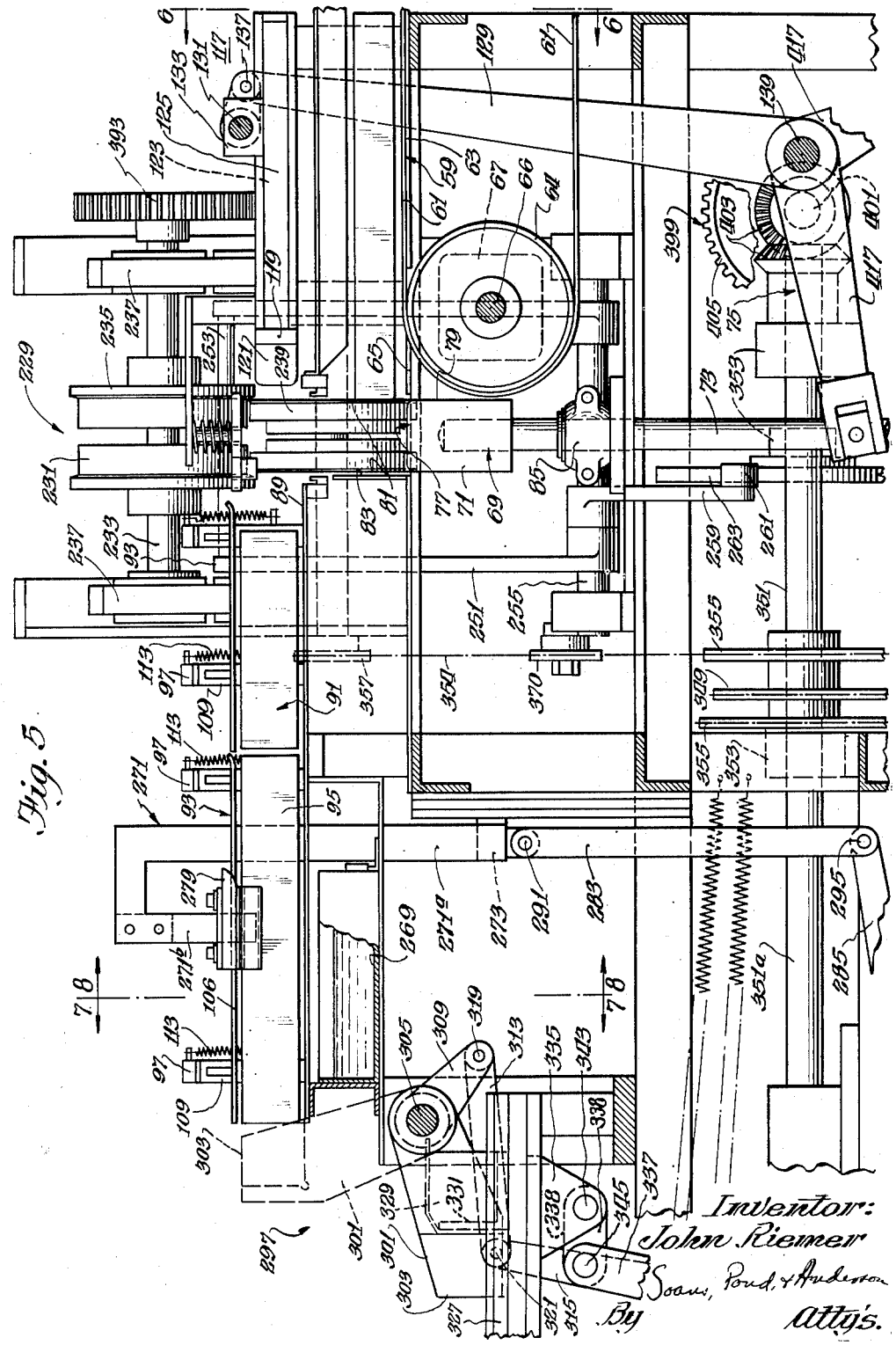

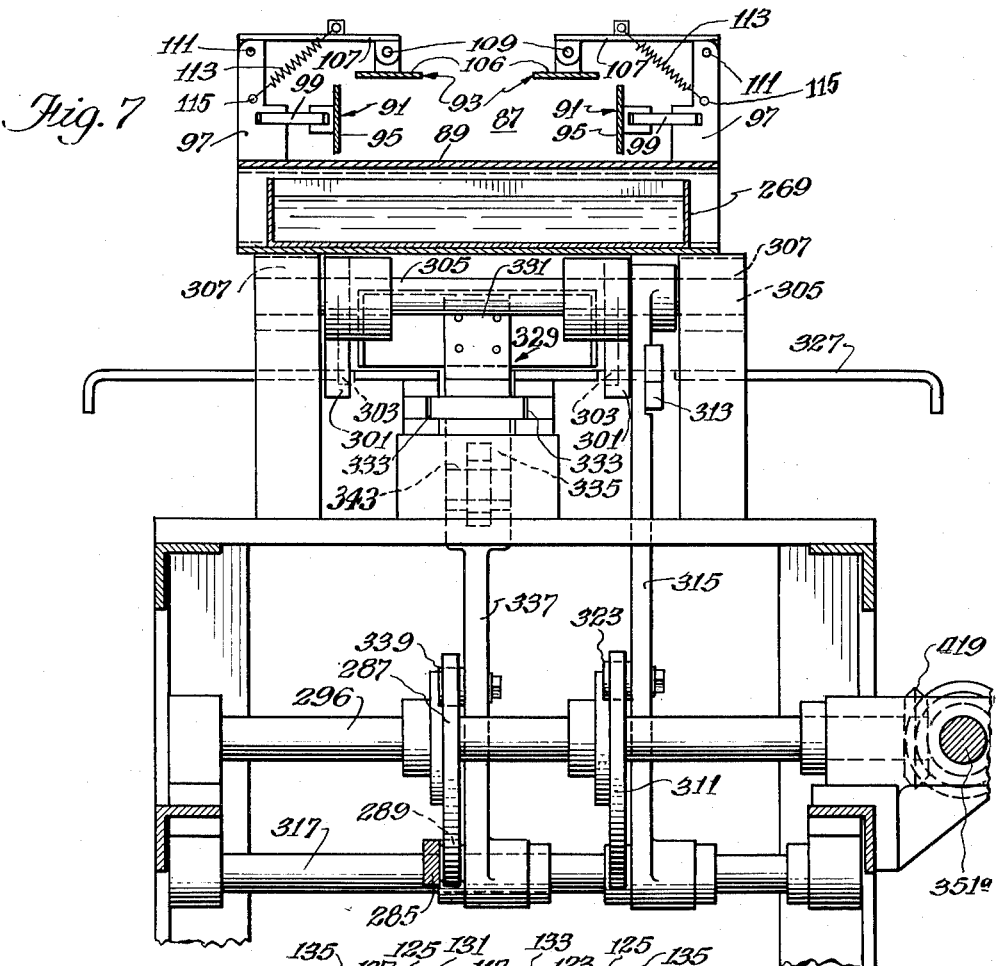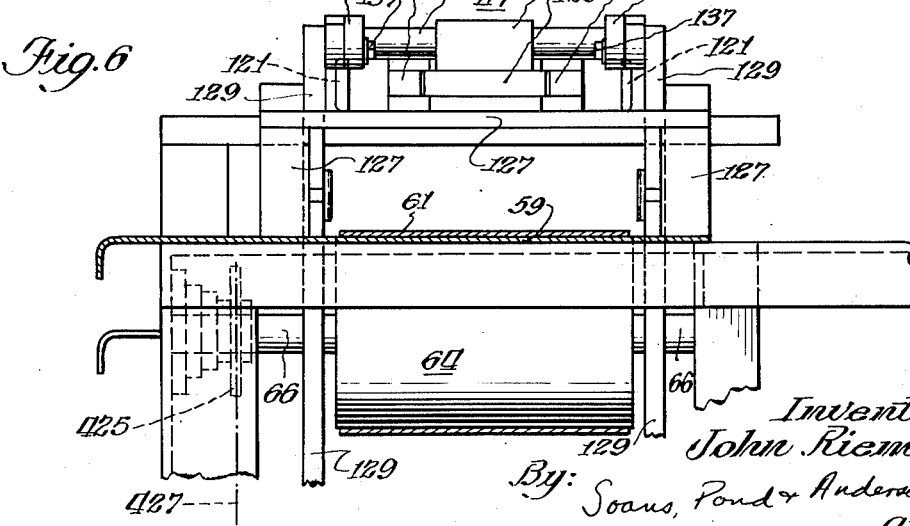

Inventor:
John Riemer
By: Soans, Pond & Anderson
Atty's

Dec. 30, 1952   J. RIEMER   2,623,338
PACKAGING MACHINE
Filed Jan. 13, 1950   10 Sheets-Sheet 8

Inventor:
John Riemer
By: Soans, Pond, & Anderson
Attys.

Dec. 30, 1952  J. RIEMER  2,623,338
PACKAGING MACHINE
Filed Jan. 13, 1950  10 Sheets-Sheet 9
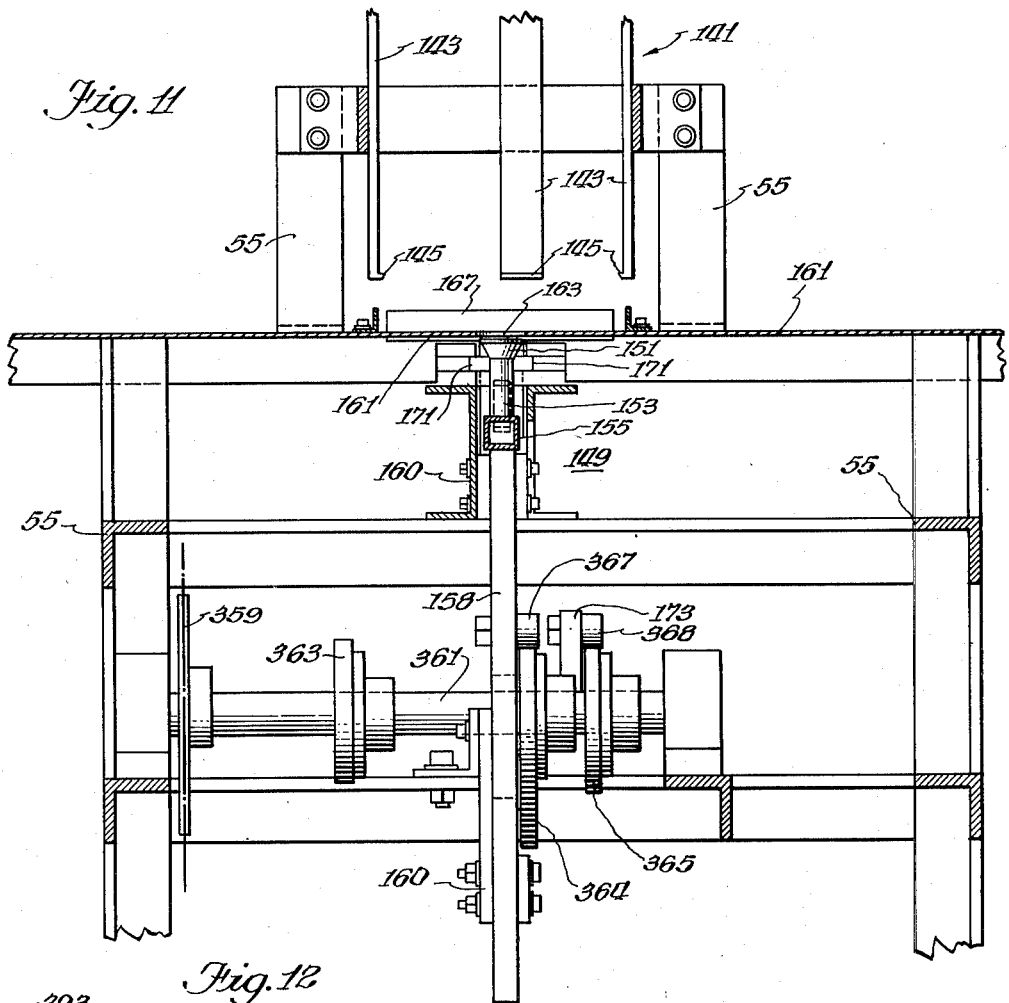
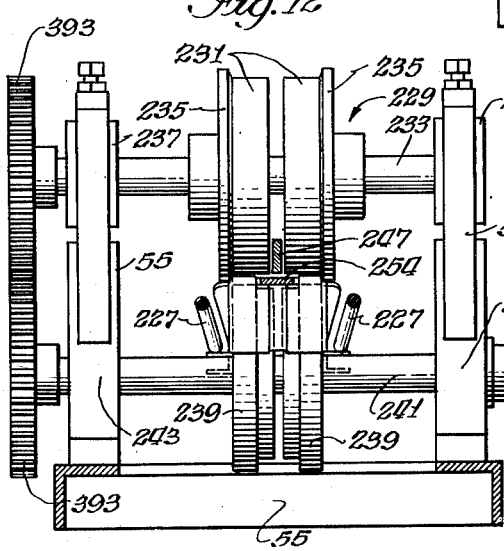
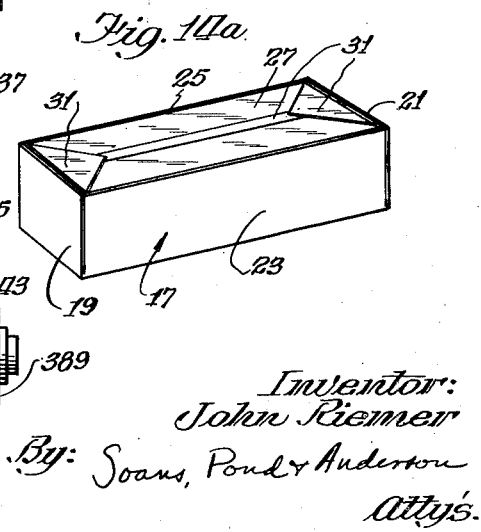
Inventor:
John Riemer
By: Soans, Pond & Anderson
Atty's

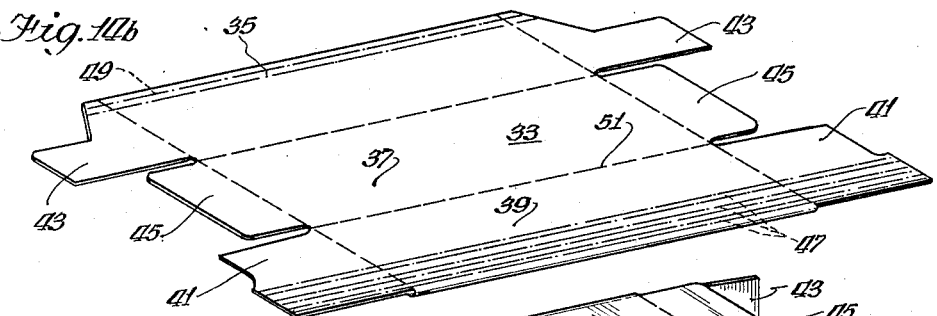
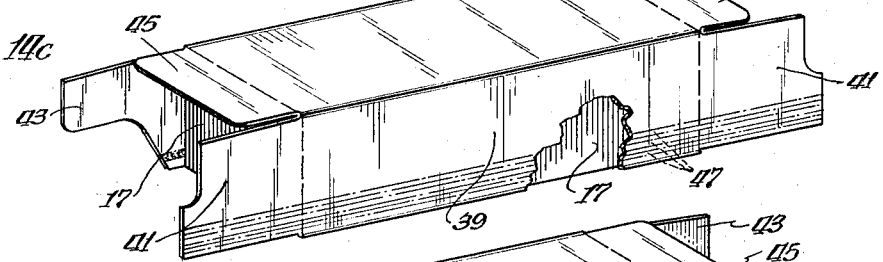
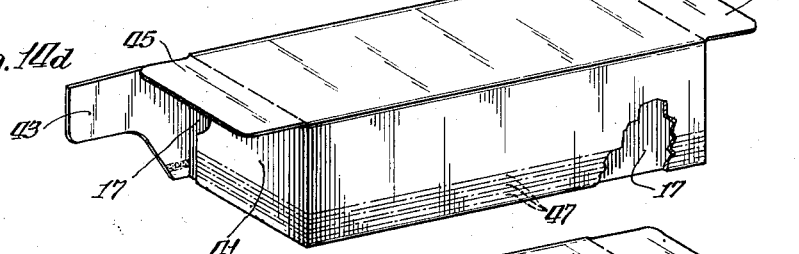
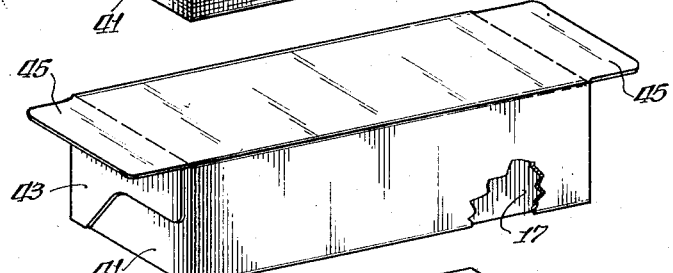
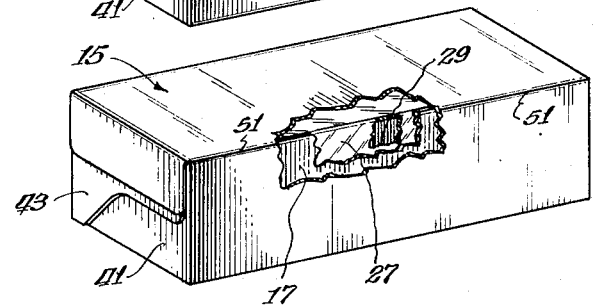

Patented Dec. 30, 1952

2,623,338

UNITED STATES PATENT OFFICE 2,623,338

PACKAGING MACHINE

John Riemer, Chicago, Ill., assignor to Kraft Foods Company, Chicago, Ill., a corporation of Delaware Application January 13, 1950, Serial No. 138,426

15 Claims. (Cl. 53—11)

The present invention relates generally to packaging machines and in particular to a machine and method for applying a cover structure to an open-topped, rectangular box or tray of the type employed in the packaging of cheese foods and like products, and in particular to a machine and method for applying a hinged cover to such an open-topped box. As will hereinafter appear, the cover structure may also comprise a decorative jacket for enclosing the ends, sides, and top of the box, thereby enhancing the appearance of the finished package.

The principal object of this invention is the provision of machinery for applying a cover structure to an open-topped box rapidly and economically without damaging the contents of the box and without marring the appearance of the cover structure. Other objects and advantages of the invention will become known by reference to the accompanying drawings (10 sheets) and the following description of one preferred embodiment thereof.

In the drawings:

Fig. 4 is a plan view of the machine shown in Figs. 1, 2, and 3;

Fig. 5 is an enlarged, fragmentary, elevational view of the machine shown in the preceding figures;

Fig. 6 is a sectional view taken on line 6—6 in Fig. 5;

Fig. 7 is a sectional view taken on line 7—7 in Fig. 5;

Fig. 11 is a sectional view taken on line 11—11 in Fig. 9;

Fig. 12 is a sectional view taken on line 12—12 in Fig. 9;

Fig. 13 is a sectional view taken on line 13—13 in Fig. 3; and

Figure 1:
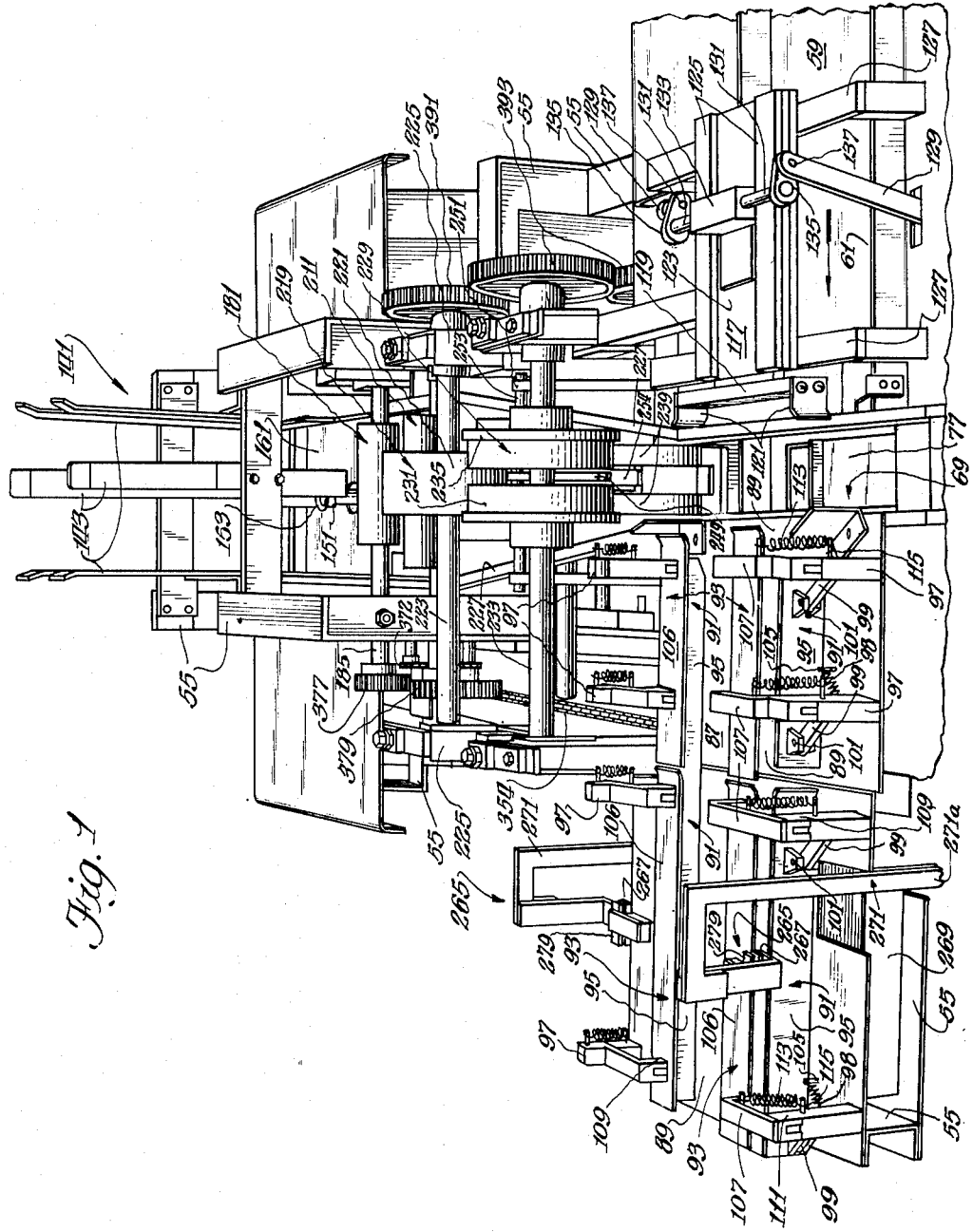
Fig. 1 is a perspective view of a packaging machine embodying various of the features of the invention.

Figs. 14a to 14f, inclusive, are perspective views showing the steps caried out by the machine in applying the hinged cover to the box.

The illustrated packaging machine is operable to apply a hinged cover structure 15 (Fig. 14f) to a filled, open-topped box. The open-topped box, indicated at 17 in Fig. 14a, is particularly designed for packaging process cheese or the like and comprises a bottom panel (not shown), end panels 19 and 21, and side panels 23 and 25. Prior to entering the packaging machine which is to be described, an inner liner or envelope 27 (Fig. 14a) is disposed within the box and the cheese or other material 29 (Fig. 14f) is poured in the envelope until the desired amount of the material is in the box 17. The envelope 27 may then be sealed manually, to provide a seal of the type shown at 31 in Fig. 14a, or this seal may be effected automatically by apparatus of the type shown in Palmer Patent No. 2,331,927. The box 17 whose envelope 27 has been filled and sealed is then ready to have the hinged cover structure 15 applied thereto.

The operation of the illustrated packaged machine will be briefly described in order to facilitate an understanding of the mechanical construction of the apparatus. The hinged cover structure 15 is fabricated from a blank 33 which is in the shape shown in Fig. 14b. The blank 33 is scored to provide a front panel 35, a top panel 37, and a back panel 39 which desirably correspond in size and shape to the sides 23 and 25 and the top of the open-topped box 17. A tab or flap is disposed at each end of each of the panels 35, 37, and 39 in order to provide means for attaching the cover structure 15 to the ends of the box 17. A flap 41 at each end of the back panel 39 is proportioned to substantially cover one of the ends 19 or 21 of the box 17 and a flap 43 at each of the ends of the front panel 35 is generally triangularly shaped, as illustrated, and is adapted to fold over the portion of the end of the box which is located generally above a diagonal line extending rearwardly and upwardly from the lower forward corner of the box 17 (Figs. 14e and 14f). A tab 45 is provided at each end of the top panel, the tab 45 being rounded in outline. The tabs 45 are adapted to be glued or otherwise attached to the flaps 43.

In operation, the packaging machine applies a number of strips or lines of adhesive 47 (Fig. 14b) to the surface of the back panel 39 which is adapted to be in contact with the side wall of the box 17, and to the end flaps 41 (Fig. 14b). A line of adhesive 49 is also applied along the outer edge of the front panel 43 of the blank (Fig. 14b). The machine is then operable to fold the blank 33 into a channel shaped section which is moved over the box 17 to be covered (Fig. 14c). The machine then folds the end flaps 41 over the ends 19 and 21 of the box 17 and pushes the box into a guideway which causes the end flaps 43 to fold across the ends of the box into the position shown in Fig. 14e. The machine then operates to fold the end tabs 45 downwardly across the ends 19 and 21 of the box after applying a spot of adhesive to the end tabs. The completed package (Fig. 14f) may then be passed from the machine into an auxiliary unit which holds the flaps 41 and 43 and the tabs 45 against the ends of the box until the adhesive has set.

When it is desired to open the container to obtain access to its contents, it is merely necessary to run a knife or other similar object between the forward panel 35 of the blank 33 and the side wall 25 of the box 17 to break the single line of adhesive 49, the top of the package then folding back along a score line 51 which is intermediate the back panel 39 and the top panel 37 of the package. As a result of the attachment of the flaps 43 to the tabs 45, the top construction is reinforced making possible repeated opening and closing of the top without distorting its shape.

The machine for applying the cover structure 15 includes a generally T-shaped frame 53 (Fig. 4), the boxes of material to be covered traveling along the bar of the T on conveyor means and the blanks 33 which are to be applied to the boxes being prepared and formed along the stem of the T and traveling towards the conveyor means to engage the boxes in the juncture at the stem and the bar. The frame 53 is of fabricated construction and includes various horizontal and vertical frame members 55 which may be of the usual structural shapes. The frame 53 is supported on the factory floor on vertically extending legs 57 (Fig. 2) which may be adjustable to dispose the unit in a horizontal position.

The filled boxes to be covered are delivered to the packaging machine upon a transfer conveyor (not shown) which moves the boxes onto a feeding conveyor 59, Figs. 1, 2, 4, and 5. The feeding conveyor 59 comprises an endless conveyor belt 61 whose upper run is supported upon a plane apron 63 (Fig. 5). The conveyor belt 61 is supported at its delivery end upon a support roll 64 which includes a supporting shaft 66 which is journalled in bearings 67 on the main frame 53. The belt 61 is adapted to move the boxes of material onto a dead space 65 on the apron 63 which is provided adjacent the discharge end of the conveyor belt. The dead space 65 is proportioned to hold one or more of the boxes to be covered. The boxes at this point, are disposed with their longitudinal axes normal to the longitudinal axis of the conveyor belt 61 of the feeding conveyor 59.

Figure 2:
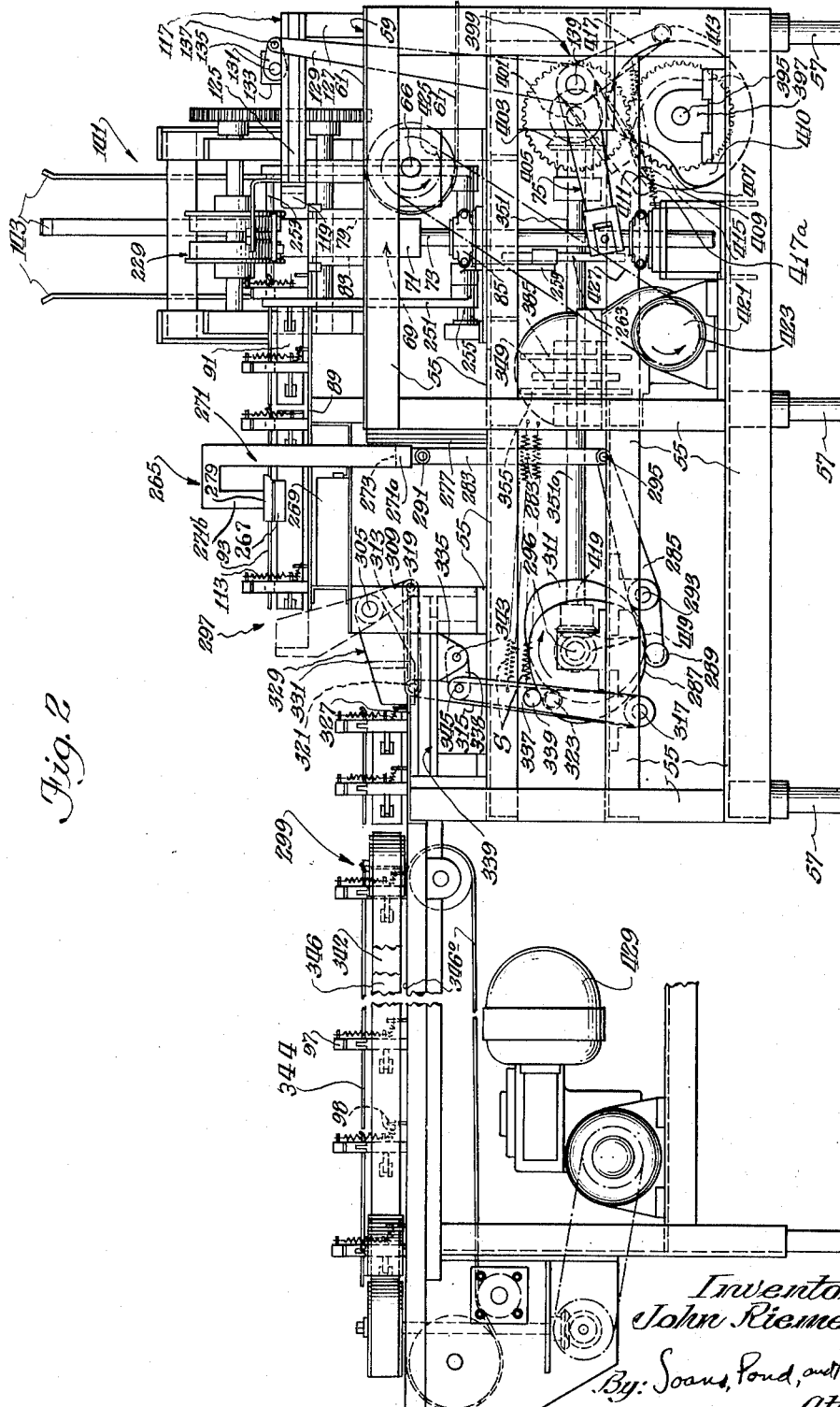
Fig. 2 is a front elevational view of the packaging machine shown in Fig. 1.
Figure 3:
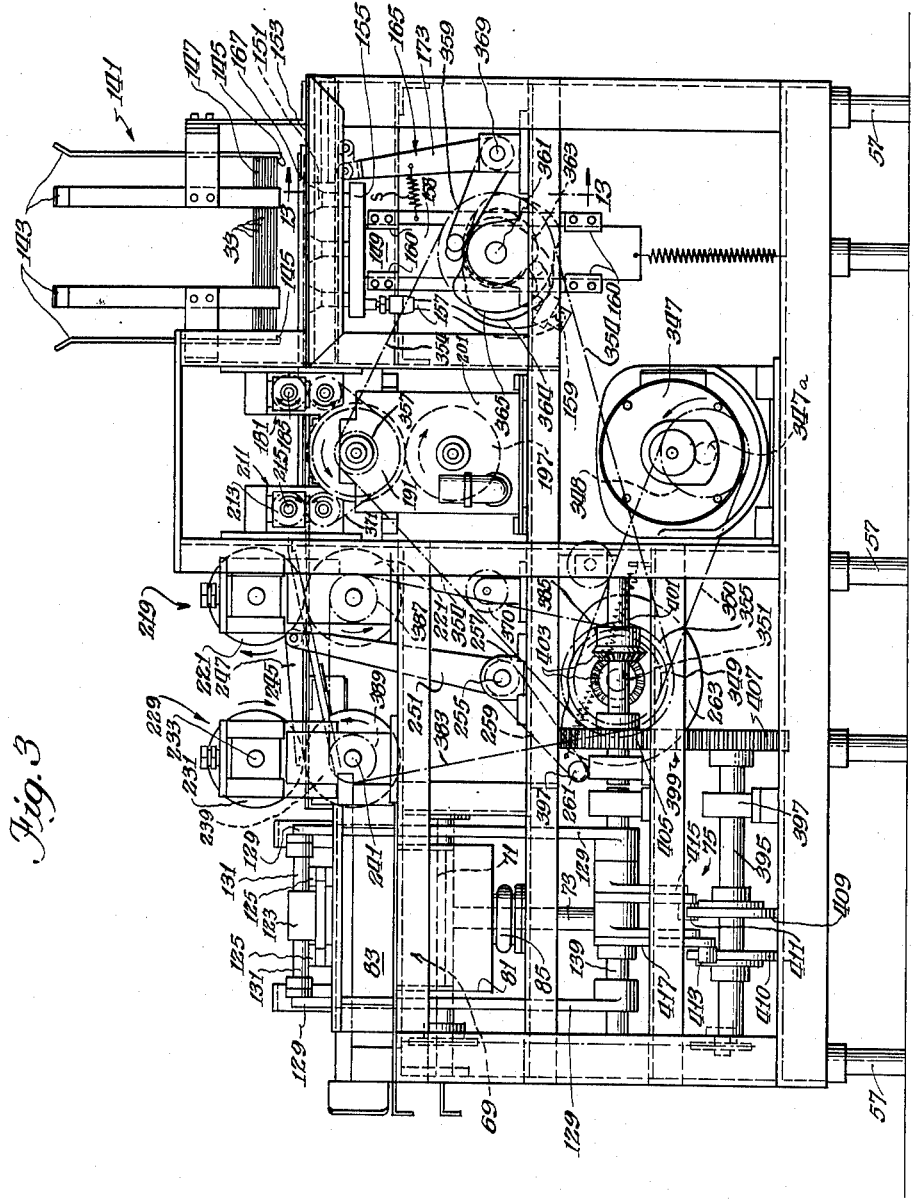
Fig. 3 is a side elevational view of the packaging machine shown in the preceding figures, this view having been taken from the right-hand side of Fig. 2.

At the end of the transfer conveyor 59 there is disposed an elevator 69 (Figs. 1, 2, 3, 4, and 5) which comprises an elevator head 71, a supporting stem 73 for the head 71, and an operating mechanism, generally indicated as 75 in Figs. 2, 3, and 5. The elevator head 71 is supported on the upper end of the stem 73 and is rectangular in shape. The head 71 includes an upper, horizontally disposed surface 77 which is proportioned to register with the bottom of the boxes being covered and a side surface 79 (Figs. 2 and 5) which is proportioned to restrain the boxes being discharged by the feeding conveyor 59 whenever the elevator is in a raised position. The elevator head 71 operates in a vertically extending guideway 81, and one of the guide surfaces, a surface 83 (Fig. 5) along the side of the elevator head 71 opposite the vertically extending elevator head side surface 79, constitutes a stop whereby the incoming boxes are indexed as they move upon the horizontal, upper surface 77 of the elevator head 71 under the action of the feeding conveyor 59. The elevator stem 73 is generally vertically extending (Fig. 5) and is slidably supported intermediate its ends in a bearing 85 for vertical reciprocating motion. The lower end of the stem 73 is connected to an operating mechanism which will be subsequently described.

At the uppermost point of the elevator travel a guideway 87 (Figs. 1, 2, 4, and 5) is provided which includes a smooth, generally horizontally disposed plate 89 which extends parallel to the feeding conveyor 59. The horizontally disposed plate 89 is elevated with respect to the feeding conveyor 59 and the upper surface 77 of the elevator head 71 moves between the level of the apron 63 of the feeding conveyor 59 and the level of the plate 89 to lift boxes from the apron 63 to the plate 89. The guideway 87 also includes inwardly biased, parallel, spaced part side walls 91 and downwardly biased upper pressure plates 93 which engage the ends and tops, respectively, of the boxes. The cover structure is applied to the boxes during the portion of the operating cycle wherein the elevator 69 is adjacent its uppermost position, this operation being described in subsequent paragraphs.

The side walls 91 of the guideway 87 comprise vertically disposed, longitudinally extending wall members 95 which are hingedly supported from stanchions 97 which are attached to the frame members 55. The hinge connection for each of the wall members 95 includes a pair of parallel links 99 which are pivotally attached by vertically extending pivots 101 to the side wall members 95 and by a second set of vertically extending pivots 103 to the stanchions 97. Springs 98 are disposed intermediate the links 99 and a fixed bracket 105 on the frame 53 in order to bias each of the wall members 95 inwardly.

The upper, pressure plates 93 comprise longitudinally extending strips of metal 106 which are horizontally disposed and which are hingedly supported from the stanchions 97 by supporting arms 107. The outer ends of the supporting arms 107 are pivotally attached to the strips 106 by horizontally disposed, longitudinally extending pivots 109 and the inner ends of the arms 107 are similarly attached to the stanchions 97 by pivots 111 (Fig. 7). Resilient biasing for the strips 106 is provided by a plurality of springs 113 which are attached to the arms 107 and to a fixed point 115 on the stanchions 97.

The boxes being covered are moved from the elevator 69 into the guideway 87 when the elevator 69 is at the uppermost point of its travel, by means of a plunger mechanism 117 (Figs. 1, 2, 5, and 6) which includes a cross head 119 proportioned to engage the rearwardmost side wall of the box. The cross head 119 includes at each end thereof, an outwardly flared, forwardly extending folding plate 121 (Fig. 4) which is adapted to engage the ends of the box. The cross head 119 is attached to a longitudinally extending member 123 which is slidably supported in a longitudinally extending guideway which is defined by a pair of channel-shaped members 125 (Fig. 5) supported on a sub-frame 127 disposed on the frame 53 above the feeding conveyor 59. The slidably supported, longitudinally extending member 123 is attached to a pair of generally vertically extending pusher arms 129 (Fig. 5) which are operated in timed relation with the movement of the elevator 69. The connection between the arms 129 and the member 123 is effected by a transversely extending shaft 131 which is journalled in a block 133 attached to the member 123, the shaft 131 having a pair of links 135, one of which is attached to each end of the shaft 131. The links 135 are hingedly attached to the upper ends of the arms 129 by horizontally disposed, transversely extending hinge pins 137. The lower ends of the arms 129 are journalled on a cross shaft 139.

Figure 9:
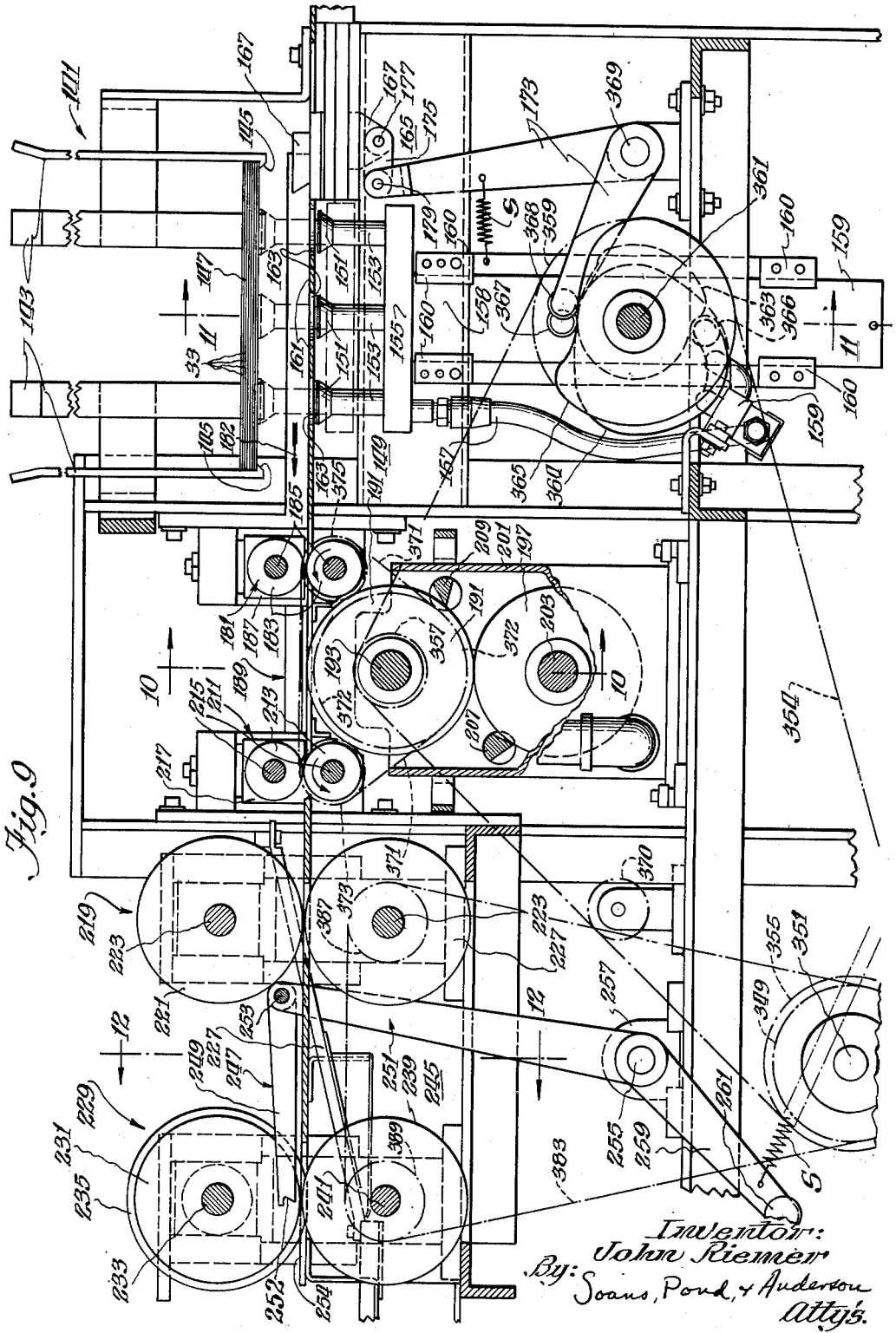
Fig. 9 is a side elevational view of the apparatus shown in the preceding figures, various parts being cut away to show certain of the operating details of the apparatus.

As has been pointed out, the hinged cover structure is applied to the box as the elevator 69 approaches its maximum elevation. The mechanism for feeding the blanks 33 and for forming these blanks about the box to which the blank is to be attached, is supported upon the portion of the frame 53 which extends normal to the conveyor means, the guideway 87 and the feeding conveyor 59 which has been described. At the outer end of the frame 53 a magazine 141 is provided for the blanks 33. The magazine 141 (Figs. 1, 2, 3, 9, and 11) comprises a plurality of vertically extending guide strips 143 which are arranged in a generally rectangular outline. The inner sides of each of the guide strips 143 are provided, adjacent the lower ends thereof, with a hook shaped portion 145 (Figs. 3, 9, and 11) which is adapted to support a stack 147 of blanks 33 (Figs. 3 and 9). The blanks 33 are arranged in the magazine 141 with the side adapted to be disposed towards the box on the bottom and with the back panel 39, the panel having the end flaps 41, disposed towards the right hand side of the magazine 141 in Fig. 4.

The blanks 33 are withdrawn from the magazine 141 one by one, by a vacuum picker 149 (Figs. 3, 9, and 11) which comprises a plurality of vacuum cups 151 which are supported at the upper ends of vertically extending vacuum pipes 153. The vacuum pipes 153 are supported upon a horizontally disposed header 155 which is connected to a vacuum pump (not shown) by a conduit 157 (Figs. 3 and 9) which includes a cam actuated control valve 159. The header 155 is attached to a frame 158 which is slidably supported for vertical movement in guides 160 upon the frame 53. The header 155 is vertically movable in timed relation with the other elements of the apparatus into the position shown in dotted outline in Fig. 9 to pick a single blank 33 from the magazine and to deposit that blank upon a table 161 which is disposed below the magazine 141. In this connection, the table 161 is provided with openings 163 for permitting vertical movement of the cups 151.

The blank 33 is moved from the table 161 towards the box about which it is to be disposed, by a pusher unit 165. The pusher unit 165 includes a pusher bracket 167 which is slidably disposed for movement longitudinally of the frame in a track or guide 171 (Fig. 11). The pusher bracket 167 is attached to the upper end of one arm of a bell crank lever 173 by means of a pivoted link 175, the link 175 being attached to the pusher bracket 167 by a horizontally disposed, transversely extending pivot 177 and to the arm of the bell crank 173 by a similar pivot 179.

The upper portion of the pusher bracket 167 is adapted to move a blank 43 forwardly along the table 161 after it is deposited upon the table 161 by the vacuum picker mechanism 149. The blank is then engaged by a pair of power driven propelling rolls 181 which rapidly move the blank towards the point of attachment to the box, the direction of the arrow 182 (Fig. 9).

Figure 10:
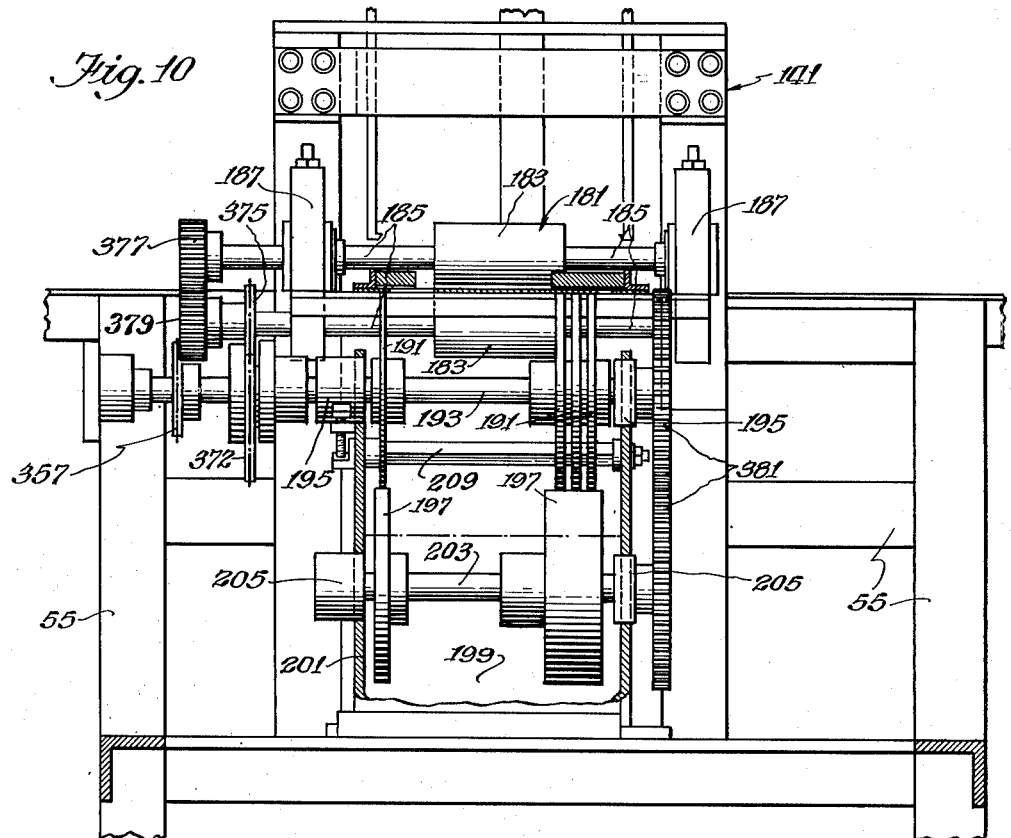
Fig. 10 is a sectional view taken on line 10—10 in Fig. 9.
Figure 8:
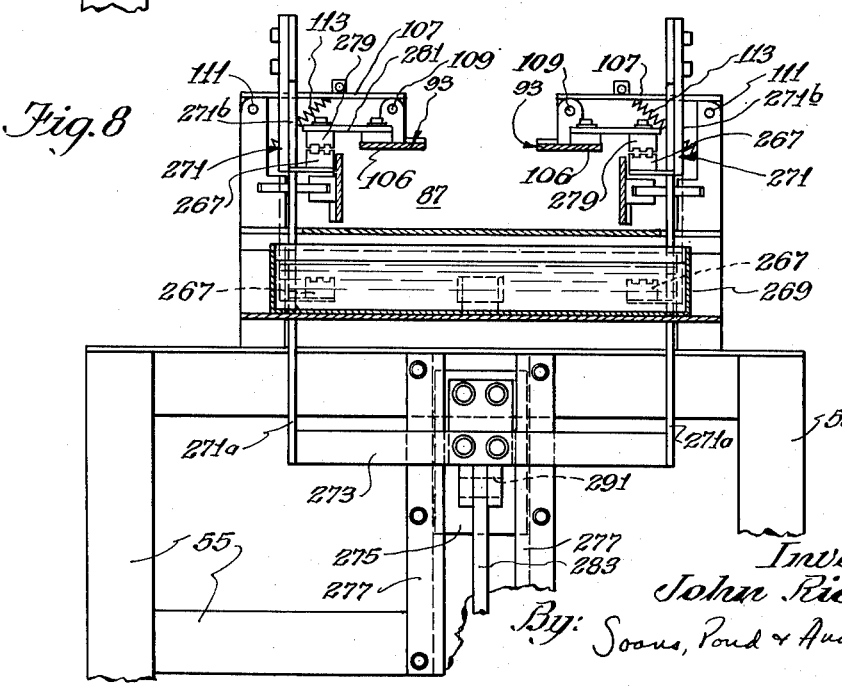
Fig. 8 is a sectional view taken on line 8—8 in Fig. 5.

The propelling rolls 181 are particularly shown in Figs. 3, 9, and 10, and constitute a pair of horizontally disposed, vertically aligned, cylindrically shaped rolls 183 each of which is supported upon a driven shaft 185. The blank 33 then passes over an applicator mechanism 189 for applying adhesive strips or lines to the blank.

The applicator mechanism 189 (Figs. 3, 9, and 10) in the illustrated machine, includes four applicator disks 191 which are attached to a shaft 193 which is rotatably supported in bearings 195. The shaft 193 is power driven and the disks are disposed on the shaft as illustrated in Fig. 10 to provide the single adhesive strip 49 along the lower portion of the forward panel 35 of the cover structure and to provide three adhesive strips 47 along the rearward panel 39 of the cover structure. The lowermost point on each of the disks 193 is engaged by one of a pair of spaced apart rollers 197 which are positioned to dip into a pool of adhesive 199 contained in a tank 201. The rollers 197 are supported upon a common shaft 203 which is journalled in bearings 205 in the sides of the adhesive tank 201. As has been pointed out, the rollers 197 dip into a pool of adhesive 199 during operation, the peripheral surface of each of the rollers 197 picking up a film of the adhesive. Excess adhesive is removed from the rollers 197 by a doctor blade 207 (Fig. 9) which is engaged against the peripheral surfaces of both of the rollers 197. The adhesive remaining on the rollers 197 is then transferred to the peripheral surfaces of the disks 191 which surfaces are then contacted by a second doctor blade 209 (Figs. 9 and 10) to remove all except a thin film of the adhesive. This remaining thin film is then transferred to the underside of the blank as it passes across the top of the applicator disks 191.

Before the rearwardmost portion of the blank 33 has been released from the pair of propelling rolls 181, the forward edge of the moving blank 33 is engaged by a second pair of propelling rolls 211 (Figs. 3 and 9) which are similar in construction to the first pair of propelling rolls 181. The second propelling rolls 211 comprises a pair of horizontally disposed, vertically arranged, cylindrical rolls 213 each of which is supported upon a shaft 215 journalled in bearings 217 on the frame. The shafts 215 are power driven as will be hereinafter described.

The blank, as it moves towards the elevator mechanism 69, then passes through a first pair of creasing rolls 219 (Figs. 1, 3, and 9). The first pair of creasing rolls 219 in the illustrated structure, comprises a pair of vertically arranged cylindrical rollers 221 which are of larger diameter than the first and second pairs of propelling rolls 181 and 211, respectively, and which are of a width which is substantially the same as the width of the top panel of the cover structure. Each of the creasing rollers 221 is supported upon a shaft 223 which is rotatably supported upon the frame of the machine in bearings 225 (Fig. 1). The rollers 221 are arranged one above the other and the supporting shafts 223 are power driven to propel the blank 33 towards the elevator mechanism 69 at which point the blank is attached to the open-topped box.

While the central portion of the blank (the top panel 37) is engaged between the pair of creasing rolls 219, the side panels 35 and 39 of the blank are engaged by a pair of diagonally disposed folding rods 227 one of which is attached to the frame at each side of the pair of creasing rolls 219, the folding rods 227 being particularly illustrated in Figs. 1 and 9. The rods 227 are disposed generally along the line of movement of the blank 33 with the forwardmost end of each of the rods 227, that is, the end advanced along the line of travel of the blank, disposed below the point of contact between the rollers 221 of the creasing rolls 219. The rearward end of each of the rods 227 is disposed above the line of contact between the rollers 221 so that the moving blank is engaged by and is moved along the rods 227. As shown in Figs. 1 and 12 the rods 227 are rather widely separated at their rearward ends and are spaced-apart adjacent their forward ends a distance approximately the width of the top panel of the blank 33. Hence, as the blank 33 moves along the machine, its engagement with the folding rods 227 causes the side panels of the blank to bend downwardly whereupon the blank assumes a channel shape with the end flaps 41 and 43 extending forwardly and rearwardly of the blank. Finally, as the blank 33 is about to become disengaged from the nip between the first pair of creasing rolls 219, the forward edge of the blank is engaged by a second pair of creasing rolls 229.

The second pair of creasing rolls 229 (Figs. 1, 3, 9, and 12) includes a pair of spaced-apart disks 231 which are disposed upon a common shaft 233, each of the disks 231 being provided with a flange 235 which is disposed about its outer peripheral surface. The supporting shaft 233 is journalled in bearings 237 on the frame, and the shaft 233 and disks 231 are power driven as will be described in a subsequent paragraph. The flanged disks 231 constitute one of the second pair of creasing rolls 229 and the other of the pair of rolls 229 comprises a pair of disks 239 which are spaced-apart so as to fit between the flanges on the disks 231 (Fig. 12). The disks 239 are located directly below the disks 231 and are supported upon a shaft 241 which is journalled in bearings 243 on the main frame. The shaft 241 is also connected to a source of power. As the blank 33, which has been partially formed into a channel shape by the folding rods 227, passes between the second creasing rolls 229, a sharp fold is effected intermediate the side panels 35 and 39 and the top panel 37 to provide neat, right angle edges for the finished container.

As the blank leaves the second pair of creasing rolls 229, it is positioned directly over the box to be covered by means of an indexing mechanism 245. The indexing mechanism 245 (Figs. 3 and 9) includes an indexing finger 247 which extends longitudinally of the line of movement of the blank 33 from the magazine 141 to the point of attachment to the box at the elevator mechanism 69. The finger 247 comprises an elongated link 249 which has one of its ends notched, as shown at 252, to engage the central portion of the end tab 45 which is disposed at the rearward end (along the line of movement) of the blank 33. The indexing finger 249 extends between the flanged disks 231 of the second pair of creasing rolls 229 and its rearward end is hingedly attached to a generally vertically extending U-shaped actuating frame 251 about a horizontally disposed hinged axis 253 (Figs. 3, 5, and 9). It will be noted that the forward end of the indexing finger 247 is slidably supported upon a horizontally extending guide 254 which is disposed between the disks 239 of the second pair of creasing rolls 229. The lower end of the U-shaped frame 251 (Fig. 5) is attached to a cross shaft 255 which is rotatably journalled in bearings 257 on the frame. The cross shaft 255 is rotated by means of an operating arm 259 (Figs. 3 and 5) which is rigidly attached at one end to the shaft 255 and whose other end is provided with a cam follower 261 which engages the peripheral surface of an operating cam 263 (Fig. 3).

As soon as the cover structure is indexed over the box which is to be covered, the plunger mechanism 117 moves the cross head 119 longitudinally toward the guideway 87 whereupon the cross head 119 engages the rearwardly disposed, side-panel 39 of the cover structure, the folding members 121 forcing the end flaps 41 inwardly across the ends of the box (into the position shown in Fig. 14d). As soon as the end flaps 41 and the rearwardly disposed side-panel 39 of the cover are pressed against the contiguous sides of the box, the adhesive strips 47, applied by three of the disks 191, cause the end flaps 41 and side panel 39 to adhere to the sides of the box. The plunger then continues to move and forces the partially enclosed box into the guideway 87 defined by the upper pressure plates 93, the yieldingly supported side walls 95, and the continuous bottom plate 89. This movement into the guideway 87 causes the end flaps 43 to be engaged by the side walls 95 of the guideway 87 thereby folding these flaps across the end flaps 41 which are secured to the ends of the box by the adhesive. (The flaps 41 and 43 are then in the position shown in Fig. 14e.) In addition, the movement of the plunger forces the forwardmost side-panel 35 of the cover structure against the adjacent side of the preceding box, and as a consequence the strip of adhesive 49 disposed along the lower edge of the side panel 35 provides sealing contact with the box.

In the guideway 87 the upper pressure plates 93 force the top panel 37 of the cover structure downwardly against the contents of the box, the side walls 95 of the guideway 87 hold the end flaps 41 and 43 in overlapping relation, and the pressure of the plunger forcing the boxes through the guideway causes the side panels 35 and 39 to become sealed to the sides of the box. At this time the end tabs 45 on the ends of the top panel 37 extend outwardly in a horizontal plane between the side walls 95 and the upper pressure plates 93.

As the row of covered boxes moves along the guideway 87, a daub of adhesive is applied to the underside of each of the end tabs 45 by a pair of dauber units 265 (Figs. 1, 2, 5, and 8). One of the dauber units 265 is located on each side of the guideway 87 and each unit includes an applicator member 267 which moves between a vat of adhesive 269 on the frame and the underside of the end tabs 45. Each of the applicator members 267 is supported upon a hook shaped frame 271 which includes a vertically extending section 271a whose lower end is mechanically interconnected to the corresponding part of the other dauber unit frame by a horizontally disposed member 273. The member 273 includes a key member 275 (Fig. 8) which is slidably supported in a vertically extending guideway 277. Another section 271b of the frame 271 extends longitudinally along the guideway 87 and supports the applicator member 267. A tab-positioning member 279 is disposed adjacent the uppermost position of each of the applicator members 267, the member 279 being supported upon one end of an arm 281 which is attached to the pressure plates 93. The forward edge of the member 279 is flared as illustrated in Figs. 2 and 5 to position the tabs 45 for the daubers, and in operation the applicator members 267 move from a position in the vat 269 (the position being shown by the dotted outline in Fig. 8) to a position contacting the tabs 45 which are disposed beneath the members 279. This reciprocating movement is effected by a generally vertically extending link 283, an operating arm 285, a cam 287 and a cam follower 289 (Figs. 2 and 5). The upper end of the link 283 is pivotally attached to the member 273 which interconnects the hook shape frames 271 for the dauber units 265. This connection is effected by means of a transversely extending, horizontally disposed hinge pin 291. The operating arm 285 is rockably supported upon a transversely extending, horizontally disposed shaft 293 attached to the frame, and one end of the arm 285 is hingedly connected to the lower end of the link 283 by a pivot pin 295. The other end of the operating arm 285 is attached to the cam follower 289 which is engaged against the cam 287. The cam 287 is supported upon a shaft 296 which is operated from the drive mechanism in timed relation with the other elements of the apparatus as will hereinafter be described.

As the covered boxes reach the end of the guideway 87 they are pushed into a turning unit 297 (Figs. 2, 5, and 7) which rotates the box 90° about its longitudinal axis and delivers it to a holding conveyor 299. The turning unit 297 includes a pair of transversely spaced apart end plates 301 each of which is provided with a recessed portion 303 for receiving the ends of one of the boxes. Each of the end plates 301 is fixedly attached to a transversely extending, horizontally disposed shaft 305 which is rotatably supported in bearings 307 on the frame. The shaft 305 is rotated by a crank arm 309 (Figs 2 and 5) attached thereto, the crank arm 309 being connected to an operating cam 311 (Fig. 2) by a link 313 and an operating arm 315. The operating arm 315 is generally vertically extending and is rotatably supported adjacent its lower end upon a transversely extending stub shaft 317. The upper end of the operating arm 315 is connected to the crank arm 309 by the link 313 which is pivotally attached to the crank arm 309 by a pivot 319 and to the operating arm 315 by a pivot 321. The operating arm 315 includes, intermediate its ends, a cam follower 323 which is engaged against the cam 311 supported upon the transversely extending shaft 296. The shaft 296, as has been pointed out, is connected to the source of power for the unit.

Under the operation of the cam 311 the two end plates 301 are operable to move as a unit between the position shown by solid lines in Fig. 2 and the position shown in dotted outline in Fig. 2. In this manner a single box is received from the guideway 87 and is moved downwardly onto a transfer tray 327.

In order to disengage the covered container from the end plates 301, the transfer tray 327 is provided with an ejector plunger mechanism 329 (Figs. 2, 5, and 7). The ejector plunger 329 includes a vertically extending bracket 331 which is slidably supported in a track 333 (Fig. 7) attached to the tray 327, for movement longitudinally of the guideway 87. The bracket 331 has a depending web 335 to which the upper end of a rock arm 337 is connected by means of a pivoted link 338. The arm 337 supports a cam follower 339 intermediate its ends which engages the cam 287 so as to rock the arm 337 and thereby reciprocate the ejector plunger 329. The link 338 is pivotally attached to the web 335 by transversely extending, horizontally disposed pivot 343 and to the upper end of the operating arm by a similar pivot 345.

The conveyor 299 is similar in construction to the guideway 87 and includes inwardly biased side members 342 which are spaced apart a distance such that the end flaps of the covered box will be held against the box and downwardly biased pressure plate 344 which engage the side walls of the cover against the box. Desirably, as illustrated, at least the discharge end of the holding conveyor 299 is provided with power driven, flexible conveyor belts 346 intermediate the side walls 342 and the ends of the boxes (Fig. 4). Similarly the bottom of the discharge end of the conveyor 299 desirably constitutes a belt conveyor 346a.

*Drive mechanism*

The entire packaging machine, with the exception of the incoming conveyor 59 and the holding conveyor 299, is driven from a suitable source of power, which in the illustrated apparatus is an electric motor 347. The motor 347 is mounted upon the frame 55 beneath the adhesive tank 201 (Fig. 3). The output shaft 347a of the motor 347 is connected by means of a pair of sprockets 348 and 349 and a drive chain 350 to a horizontally disposed shaft 351 which extends parallel to the supporting shafts for the sets of propelling rollers 181 and 211, adhesive applicator mechanism 189, etc. (Fig. 2). The shaft 351 is journalled for rotation in suitable bearings 353 (Fig. 5) on the main frame 55.

In order to drive the mechanism which forms the blanks 33, a drive chain 354 is trained around a sprocket 355 attached to the shaft 351, a sprocket 357 attached to the shaft 193 of the adhesive applicator disks 191, and a sprocket 359 on a shaft 361 which supports operating cams 363, 364, and 365 (Figs. 3 and 9). In this connection, a cam follower 366 (Fig. 9) operatively connected to the vacuum control valve 159 is engaged against the cam 363 (Fig. 3). The vertical movement of the vacuum picker unit 149 is effected by means of a cam follower 367 (Figs. 9 and 11) which is attached to frame 158 of that unit, the follower 367 being engaged against the cam 364 (Figs. 3 and 5). The pusher unit 165 is reciprocated longitudinally of the path of movement of the blank to be formed, in timed relation with the other elements, by a cam follower 368 attached to one of the arms of the bell crank lever 173, that lever being hingedly attached to the main frame 55 by a pivot 369 (Fig. 9). In order to maintain the proper tension in the chain 354, an adjustable chain tightener 370 is disposed along the run as illustrated in Fig. 3 and Fig. 9.

The two sets of propelling rolls 181 and 211 are driven from the shaft 193 of the applicator disks 191 by means of a chain 371 which is trained around a sprocket 372 on the shaft 193 and sprockets 373 and 375 attached to the lower of the supporting shafts 215 and 185 for the propelling rolls. The upper of each of the sets of propelling rolls 181 and 211 are driven from the lower of the associated rolls by means of pairs of meshing spur gears 377 and 379, respectively, one of which is attached to the end of each of the shafts 215 and 185 (Figs. 1 and 10).

The adhesive pick-up rollers 197 are also driven from the upper disk shaft 193, this drive being effected by a pair of spur gears 381, one of which is attached to the shaft 203 and the other of which is attached to the shaft 193 (Fig. 10).

The creasing rolls 219 and 229 are driven from the cross shaft 351 by means of a drive chain 383. The chain 383 engages a sprocket 385 on the cross shaft 351 with a sprocket 387 on the lower of the shafts 223 and with a sprocket 389 which is attached to the shaft 241. The upper of the creasing rolls in the sets 219 and 229 are driven by sets of meshing spur gears 391 and 393, respectively, from the lower of the rolls (Figs. 1 and 5). The sprockets and gears which have been described are so proportioned that the entire blank forming operation is carried on as a continuous, smooth movement which is timed with the operation of the package elevator unit 69.

The timing and operating means for the plunger mechanism 117 and for the elevator mechanism 69 is driven from a horizontally disposed shaft 395 which is arranged transversely of the line of movement of the incoming conveyor 59 (Figs. 2 and 3). The shaft 395 is journalled in suitable bearings 397 on the main frame and is connected to the cross shaft 351 which has been described, by means of a gear train 399 (Figs. 2, 3, and 5). The gear train 399 includes a horizontally disposed stub shaft 401 which intersects the axis of the cross shaft 351 and which is connected to the cross shaft 351 by a set of miter gears 403. The stub shaft 401 carries a spur gear 405 which meshes with a spur gear 407 on the end of the shaft 395. The shaft 395 carries cams 409 and 410 which are interengaged by cam followers 411 and 413 connected to the plunger mechanism 117 and to the box elevator mechanism 69, respectively. In this connection, the shaft 139 upon which the actuating arms 129 for the plunger mechanism 117 is mounted, is connected to the cam follower 411 through an arm 415 fixed to the shaft 139, this constituting a part of the plunger operating mechanism. The reciprocating movement of the elevator mechanism 69 is effected from the cam 410 by operatively connecting the cam follower 413 to the lower end of the elevator supporting stem 73 by a bell crank lever 417 which is rotatably journalled on the shaft 139 (Figs. 2 and 3). In order to assure upward movement of the elevator mechanism 69 is effected from the cam 410 by operating the cam 410, a tension spring 417a is connected between the crank lever 417 and the frame 53 of the packaging machine in the manner shown in Fig. 2. The spring 417a may be eliminated by using a cam of the positive return or positive motion type in place of the cam 410, in view of the fact that in such an arrangement the cam follower 413 is held in positive engagement with the cam at all times.

The drive for the turn-over unit 297 and for the dauber unit 271 is obtained from an extended portion 351a of the cross shaft 351. The portion 351a extends longitudinally of the cross bar of the T-shaped frame 51 to the cross shaft 296 which supports the cams 311 and 287 which have been described. The extended portion 351a is connected to the cross shaft 296 by a pair of miter gears 419 (Figs. 2 and 7).

The incoming conveyor 59, as before noted, is driven from a separate source of power, which, in the illustrated unit, comprises a combined electric motor and speed reducer unit 421 illustrated in Fig. 2. The unit 421 includes an output sprocket 423 which is connected to a sprocket 425 on the supporting shaft 66 for the delivery pulley of the conveyor 59 by a drive chain 427 (Fig. 2). As illustrated, the transfer conveyor 299 is also driven by a separate motor and speed reducer unit 429.

The various cam followers and supports therefor are provided with springs to maintain the followers in engagement with their associated cams. For the purpose of clarifying the drawings these springs have been indicated by a diagrammatic representation of a tension spring designated as S which extends between a fixed point and the cam follower or its associated operating arm. For example, see Fig. 9 where the spring S for the follower 368 extends between the fixed guide members 160 and the bell crank lever 173.

*Operation*

In operation, the incoming, uncovered boxes of material are delivered onto the conveyor 59 with the longitudinal axes thereof disposed at right angles to the line of movement of the conveyor. The conveyor 59 advances the box onto the vertically reciprocating elevator unit 69 which lifts the boxes one by one to a position where the hinged cover structure is at least partially attached to the box.

The blank 33 which is ultimately formed into the hinged cover structure is removed from the magazine 141 by the vacuum pick-off unit 149 and deposited upon the table 161. During the period the blank is held by the pick-off unit 149, the control valve 159 under the actuation of the cam 363 applying vacuum to the unit 149 and breaking the vacuum when the blank is deposited on the table 161. After the blank 33 is deposited upon the table 161, the pusher unit 165 under the actuation of the cam 364 moves the blank longitudinally of the table 161 into the first set of propelling rolls 181. The blank 33 is then propelled across a set of adhesive applicator disks 191 which apply the strips of adhesive 47 and 49 (Figs. 14b, 14c, and 14a) to the side panels 35 and 39 and the end flaps 41.

After passing over the applicator disks 191, the blank is engaged by the second set of propelling rolls 211 which direct the blank into the first and second sets 219 and 229 of creasing rolls. These creasing rolls, co-acting with the rods 227, fold the blank into an elongated channel-shaped section having flaps at each end of each of the sides of the channel section and at the top thereof. This channel-shaped, formed blank as it leaves the second set of creasing rolls 229 is propelled longitudinally of the box to be covered into a position wherein the top of the channel section overlies the top of the box to be covered and the sides of the channel section register with the sides of the box (as in Fig. 14c). Accurate positioning of the channel section on the box is effected by the cam driven indexing mechanism 245.

As soon as the cover is indexed over the box, the plunger mechanism 117 actuated by the cam 409 is operable to move the cross head 119 into engagement with the box thereby moving the box into the guideway 87. Incident to the initial movement of the box by the cross head 119, the folding plates 121 act upon the end flaps 41 associated with the side 39 of the cover structure, that side being disposed rearwardmost along the line of movement of the conveyor 59. This engagement folds the flaps 41 against the ends of the box 17. The box then appears as shown in Fig. 14d of the drawings. Continued movement of the plunger mechanism 117 forces the box into the guideway 87, and incident to this movement, the end flaps 43 on the forwardmost side of the cover are folded rearwardly across the flaps which have been folded by the folding plates 121, the box 17 being employed as a mandrel.

The operation of the blank forming mechanism and the elevator unit 69 is effected in timed relation by the various actuating cams so that a folded blank is propelled over the filled box on each upward movement of the reciprocating elevator unit 69. The movement of the box from the elevator into the guideway 87 is effected at substantially the uppermost point in the movement of the elevator unit 69.

As succeeding boxes are partially covered at the top of the elevator stroke and are moved into the guideway 87, the boxes in the guideway 87 are moved longitudinally by the pressure of the following boxes. While the box is in the guideway 87 the spring biased side walls 91 and the pressure plates 93 along the top of the box serve to hold the cover structure firmly against the filled box. This permits the adhesive to set thereby attaching the sides 35 and 39 of the cover structure and the end flaps 41 to the associated side and end walls of the box. The boxes move along the guideway 87 to a point where the tabs 45 associated with the top panel 37 are engaged by a dauber unit 265 which reciprocates vertically in timed relation with the other elements which have been described to apply a daub of adhesive to the underside of the tab. At this point, the box appears as shown in Fig. 14e of the drawings.

At the end of the guideway 87 the boxes are forced one by one into the turning unit 297 which grasps the ends of the box and lowers it to the transfer tray 327 while, at the same time, rotating the box 90°. The top of the box then faces forwardly along the line of movement of the holding conveyor 299. When the box is in position at the entrance to the holding conveyor 299, the ejector mechanism 329 moves forwardly to force the box into the holding conveyor 299. The movement into the conveyor 299 effects the folding of the tabs 45 against the flaps 43 to effect an attachment therebetween. Successive movements of the ejector mechanism 329 cause the holding conveyor 299 to become filled and, during the time that the box is in the holding conveyor 299, the adhesive daub holding the end tabs 45 to the flaps 43 sets to provide a permanent bond. The operation of the turning unit 297 and the ejector mechanism 329 is timed with the operation of the elevator unit 69 and the plunger mechanism 117 so that a box is taken from the discharge end of the guideway 87 every time a box is introduced into the guideway 87 by the plunger mechanism 117.

It will be seen from this description of the operation of the preferred embodiment of the apparatus that a tight fitting cover structure is applied to each box, since the box itself is employed as a mandrel for forming the cover structure. The operation is extremely efficient since there are a minimum number of moving parts and the feature of turning the box and forcing it into the guideway 299 eliminates the need for complicated apparatus for folding the tabs 45. In a commercial embodiment of the machine which has been described, it has been possible to efficiently cover over about 150 boxes per minute.

Various features of the invention which are believed to be new are set forth in the appended claims.

I claim:

1. In a machine of the class described for applying a cover to a box having side walls and end walls, said cover comprising a top panel having a tab at each end thereof and side panels, each of said side panels having a flap associated with each end thereof, means for folding said cover into an open-ended, channel-shaped section, means for moving said channel-shaped section in the direction of its channel, means for aligning the box to be covered with the moving channel-shaped section whereby said section is moved lengthwise of said box into covering relation therewith, movable means for folding the flaps associated with one of said side panels against the ends of said box and for moving said box into engagement with stationary means proportioned to fold the flaps associated with the other of said side panels against the first folded flaps and for holding said flaps in a closed position, and means for folding said tabs into sealing relation with the set of flaps folded by said stationary folding means.

2. In a machine of the class described for applying a cover to an elongated box having side walls and end walls, said cover comprising a top panel having a tab at each end thereof and side panels, each of said side panels having a flap associated with each end thereof, said flaps, tabs, and panels constituting a generally rectangular blank, means for folding said blank into an open-ended, channel-shaped section, means for propelling said section in a direction parallel to its longitudinal axis, means for applying adhesive to the sides of said channel-shaped section, means for aligning the box to be covered with the moving channel-shaped section whereby said section is moved lengthwise of said box into covering relation therewith, reciprocating means for folding the flaps associated with one of said side panels into engagement with the ends of said box, means defining a passageway, said reciprocating means forcing said box into said passageway thereby effecting the folding of the flaps associated with the other of said side walls, said passageway holding said flaps in a closed position, means for applying adhesive to said tabs, and means for folding said tabs into sealing relation with the set of flaps folded by the entrance of said box into said passageway.

3. In a machine of the class described for applying a cover to a box having side walls and end walls, said cover comprising a top panel having a tab at each end thereof and side panels, each of said side panels having a flap associated with each end thereof, means for folding said cover into an open-ended, channel-shaped section, means for propelling said section in the direction of its channel, means for aligning the box to be covered with the moving channel-shaped section whereby said section is moved lengthwise of said box into covering relation therewith, reciprocating means for folding the flaps associated with one of said side panels across the ends of said box and for moving said box in a direction normal to its longitudinal axis, means defining a first passageway for receiving said box as it is moved by said reciprocating means, thereby effecting the folding of the flaps associated with the other of said side walls across the first folded flaps, said first passageway holding said flaps in a closed position, a second passageway proportioned to receive said box, means for engaging the ends of said box in said first passageway and delivering said box into said second passageway, said box being rotated incident to the movement from said first passageway to said second passageway whereby the top of said box enters said second passageway first, said tabs being folded into sealing relation with the set of flaps folded by the entrance of said box into said first passageway as an incident to being delivered to said second passageway.

4. In a machine of the class described for applying a cover to an elongated box having side walls and end walls, said cover comprising a top panel having a tab at each end thereof and side panels, each of said side panels having a flap associated with each end thereof, said flaps, tabs, and panels constituting a generally rectangular blank, means for folding said blank into an open-ended, channel-shaped section, means for propelling said section in a direction parallel to its longitudinal axis, means for aligning a box to be covered with the moving channel-shaped section whereby said section is moved lengthwise of the box into covering relation therewith, reciprocating means for folding the flaps associated with one of said side panels across the ends of said box and for moving said box in a direction normal to its longitudinal axis, means defining a first passageway for receiving the box as it is moved by said reciprocating means, thereby effecting the folding of the flaps associated with the other of said side walls across the first folded flaps, said first passageway holding said flaps in a closed position, a second passageway proportioned to receive the box, a pair of rotatably supported arms for engaging the ends of a box in said first passageway and delivering that box into said second passageway, the box being rotated incident to the movement from said first passageway to said second passageway whereby the top of the box is positioned to enter said second passageway, and reciprocating ejector means for moving the box into said second passageway, said tabs being folded into sealing relation with the set of flaps folded by the entrance of said box into said first passageway as an incident to being moved into said second passageway.

5. In a machine of the class described for applying a cover to an elongated box having side walls and end walls, said cover comprising a top panel having a tab at each end thereof and side panels, each of said side panels having a flap associated with each end thereof, said flaps, tabs, and panels constituting a generally rectangular blank, means for folding said blank into an open-ended, channel-shaped section, means for propelling said section in a direction parallel to its longitudinal axis, means for aligning a box to be covered with the moving channel-shaped section whereby said section is moved lengthwise of the box into covering relation therewith, reciprocating means for folding the flaps associated with one of said side panels across the ends of said box and for moving said box in a direction normal to its longitudinal axis, means defining a first passageway for receiving the box as it is moved by said reciprocating means, thereby effecting the folding of the flaps associated with the other of said side walls across the first folded flaps, said first passageway holding said flaps in a closed position, a second passageway proportioned to receive the box, a pair of rotatably supported arms for engaging the ends of a box in said first passageway and delivering that box into said second passageway, means for rotating said arms to move a box from said first passageway in timed relation with the delivery of a box to said first passageway by said reciprocating means, the box being rotated incident to the movement from said first passageway to said second passageway whereby the top of the box is positioned to enter said second passageway and reciprocating ejector means for moving the box into said second passageway, said tabs being folded into sealing relation with the set of flaps folded by the entrance of said box into said first passageway as an incident to being moved into said second passageway.

6. In a machine of the class described for applying a cover comprising a top panel and side panels, end flaps being associated with each of said side panels, to a box having side walls and end walls, means defining a passageway having dimensions which are approximately those of the box being covered, means for indexing said cover over said box with the top panel and side panels of said cover overlying the top and sides of said box, and means for moving said box into said passageway with said cover overlying said box, the movement of said box into said passageway being operable to fold the flaps at the ends of one of said side panels into engagement with the ends of said box.

7. In a machine of the class described for applying a cover comprising a top panel and side panels, end flaps being associated with each of said side panels, to an elongated box having side walls and end walls, a conveyor for the incoming boxes to be covered, means defining a passageway having dimensions which are approximately those of the box being covered, means intermediate said conveyor and said passageway for engaging one of said incoming boxes and for moving it into position to receive said cover, means for indexing said cover over said box with the top panel and side panels of said cover overlying the top and sides of said box, and means for moving said box into said passageway including a reciprocating plunger, means on said plunger for folding the end flaps on the side engaged by said plunger into engagement with the ends of said box, the movement of said box into said passageway under the action of said plunger being operable to fold said flaps associated with the other of said side panels into a position overlying the flaps folded by said plunger.

8. In a machine of the class described for applying a cover comprising a top panel and side panels, end flaps being associated with each of said side panels, to an elongated box having side walls and end walls, a conveyor for the incoming boxes to be covered, means defining a passageway having cross-sectional dimensions which are approximately equal to those of the box being covered, said passageway being vertically spaced relative to said conveyor, means intermediate said conveyor and said passageway for engaging said box and for moving it from said conveyor to a position in alignment with said passageway, means for forming said cover structure into a channel-shaped section, means for moving said channel-shaped section longitudinally of said box as it is positioned in alignment with said passageway until the top panel and side panels of said cover overlie the top and sides of said box, and means for moving said box into said passageway including a reciprocating plunger, means on said plunger for folding the end flaps on the side engaged by said plunger into engagement with the ends of said box, the movement of said box into said passageway under the action of said plunger being operable to fold said flaps associated with the other of said side panels into a position overlying the flaps folded by said plunger.

9. In a machine of the class described for applying a cover comprising a top panel and side panels having flaps associated with each end thereof, to an elongated box having side walls and end walls, a conveyor for the incoming boxes to be covered, means defining a passageway having cross-sectional dimensions which are approximately equal to those of the box being covered, said passageway-defining means being vertically spaced relative to said conveyor, means intermediate said conveyor and said passageway for engaging said box and for moving it from said conveyor to a position in alignment with said passageway, means for forming said cover structure into a channel-shaped section, means for moving said channel-shaped section longitudinally of said box as it is positioned in alignment with said passageway, said last mentioned means including a pair of rolls for propelling the channel-shaped section longitudinally of said box, and a reciprocating indexing means for indexing said cover over said box with the top panel and side panels of said cover overlying the top and sides of said box, and means for moving said box into said passageway including a reciprocating plunger, and means on said plunger for folding the flaps on the side panel engaged by said plunger into engagement with the ends of said box, the movement of said box into said passageway under the action of said plunger being operable to fold the flaps associated with the other of said side panels into a position overlying the flaps folded by said plunger.

10. In a machine of the class described in which a plane, elongated blank of paperboard is formed into a channel-shaped section having a top and depending side walls, means for propelling the blank longitudinally of the central area of the blank which area is to become the top of said channel-shaped section, a first pair of rolls disposed along the line of movement of said blank, one of said first pair of rolls being engaged against each side of said blank, each of said first pair of rolls having peripheral surfaces which are proportioned to extend across and to engage the central portion of said blank over a width which corresponds to the width of the top of the channel-shaped section to be formed, means for folding the marginal portions of said blank downwardly to at least partially form the channel-shaped section while the central portion of said blank is held between said first pair of rolls, a second pair of rolls positioned to engage one end of said blank before the other end thereof leaves said first pair of rolls, said second pair of rolls including a roll for engaging each of the surfaces of the top of said partially formed channel-shaped section, one of said rolls being provided with a flange which extends radially outwardly from said roll and which extends across the edge of the peripheral surface of the other of said second pair of rolls, whereby movement of said partially formed channel section between said second set of rolls completes the folding of said section into a channel-shaped section having side walls which are disposed at substantially right angles to the top thereof.

11. In a machine of the class described in which a plane, elongated blank of paper board is formed into a channel-shaped section having a top and depending side walls, means for propelling the blank longitudinally of the central area of the blank which area is to become the top of said channel-shaped section, a first pair of rolls disposed along the line of movement of said blank, one of said first pair of rolls being engaged against each side of said blank, each of said first pair of rolls having peripheral surfaces which are proportioned to extend across and to engage the central portion of said blank over a width which corresponds to the width of the top of the channel-shaped section to be formed, means for folding the marginal portions of said blank downwardly to at least partially form the channel-shaped section while the central portion of said blank is held between said first pair of rolls, including a pair of rods one of which is positioned on each side of said rolls, said rods being located to engage the marginal portions of said blank and to direct those portions downwardly incident to the movement of said blank longitudinally between said first pair of rolls, a second pair of rolls positioned to engage one end of said blank before the other end thereof leaves said first pair of rolls, said second pair of rolls including a roll for engaging each of the surfaces of the central area of said partially formed channel-shaped section, one of said rolls being provided with a flange which extends radially outwardly from said roll and which extends across the edge of the peripheral surface of the other of said said second pair of rolls, whereby movement of said partially formed channel section between said second set of rolls completes the folding of said section into a channel-shaped section having side walls which are disposed at substantially right angles to the top thereof.

12. The method of covering an elongated, rectangular box with an overlying cover structure which includes side walls and a top, comprising the steps of forming a generally rectangular blank having adjacent portions thereof proportioned to overlie the top and sides of said box into a channel-shaped section, positioning said box with its upper surface substantially in the plane of the top of said channel-shaped section, said channel-shaped section being spaced apart from said box and in longitudinal axial alignment therewith, and moving said channel-shaped section longitudinally of said box into registering relation therewith so that the top and side walls of said channel-shaped section register with the open top and side walls of said box.

13. The method of covering a box with an overlying cover structure which includes side walls and a top, comprising the steps of applying adhesive to selected portions of a generally rectangular blank having adjacent portions thereof proportioned to overlie the top and sides of said box, forming said rectangular blank into a channel-shaped section such that said selected portions are on the side walls of said channel-shaped section, positioning said box in longitudinally spaced, axial alignment with said channel-shaped section, moving said channel-shaped section longitudinally of said box into registering relation therewith so that the top and side walls of said channel-shaped section overlie the open top and side walls, respectively, of said box, and applying pressure to the sides of said box and channel-shaped section to adhesively unite said channel-shaped section to the side walls of said box.

14. In a machine of the class described for applying a cover to a box having side walls and end walls, said cover comprising a top panel having a tab at each end thereof and side panels, each of said side panels having a flap associated with each end thereof, means for folding said cover into an open-ended, channel-shaped section, means for moving said channel-shaped section in the direction of its channel, means for aligning the box to be covered with a moving channel-shaped section whereby said section is moved lengthwise of said box into covering relation therewith, movable means for folding the flaps associated with one of said side panels against the ends of said box and for moving said box into engagement with stationary means proportioned to fold the flaps associated with the other of said side panels against the ends of said box, and means for folding said tabs over both of said flaps and into sealing relation with a flap at each end of said cover.

15. In a machine of the class described for applying a cover to an elongated box having side walls and end walls, said cover comprising a top panel having a tab at each end thereof and side panels, each of said side panels having a flap associated with each end thereof, said flaps, tabs, and panels constituting a generally rectangular blank, means for folding said blank into an open-ended, channel-shaped section, means for propelling said section in a direction parallel to its longitudinal axis, means for aligning the box to be covered with the moving channel-shaped section whereby said section is moved lengthwise of said box into covering relation therewith, reciprocating means for folding the flaps associated with one of said side panels into engagement with the ends of said box, means defining a passageway, said reciprocating means forcing said box into said passageway thereby effecting the folding of the flaps associated with the other of said side walls, said passageway holding said flaps in a closed position, means for applying adhesive to said tabs, and means for folding said tabs over both of said flaps and into sealing relation with a flap at each end of said cover.

JOHN RIEMER.

REFERENCES CITED

The following references are of record in the file of this patent:

UNITED STATES PATENTS

| Number | Name | Date |
|---|---|---|
| 714,032 | Reuling | Nov. 18, 1902 |
| 1,997,718 | Claff | Apr. 16, 1935 |
| 2,292,840 | Martindell | Apr. 11, 1942 |
| 2,298,363 | Ganz | Oct. 13, 1942 |
| 2,379,920 | Peters | July 10, 1945 |
| 2,512,074 | Sandberg | June 20, 1950 |